United States Patent [19]
Smith et al.

[11] Patent Number: 5,970,127
[45] Date of Patent: Oct. 19, 1999

[54] CALLER IDENTIFICATION SYSTEM FOR WIRELESS PHONE JACKS AND WIRELESS MODEM JACKS

[75] Inventors: Scott D. Smith, Murray; Scott R. Bullock, South Jordan; David W. Thorson, Salt Lake City; John M. Knab, Sandy, all of Utah

[73] Assignee: Phonex Corporation, Midvale, Utah

[21] Appl. No.: 08/951,532

[22] Filed: Oct. 16, 1997

[51] Int. Cl.⁶ .............................. H04M 1/56; H04M 9/00; H04M 11/04
[52] U.S. Cl. ...................... 379/142; 455/402; 340/310.06
[58] Field of Search ............................ 379/142; 455/402; 340/310.01, 310.02, 310.07, 310.08, 310.06

[56] References Cited

U.S. PATENT DOCUMENTS

| | | |
|---|---|---|
| 2,510,273 | 6/1950 | Barstow et al. . |
| 2,516,211 | 7/1950 | Hochgraf . |
| 2,516,763 | 7/1950 | Edson et al. . |
| 2,535,446 | 12/1950 | Mitchell . |
| 2,567,908 | 9/1951 | Levy . |
| 2,577,731 | 12/1951 | Berger . |
| 2,654,805 | 10/1953 | Deer . |
| 2,820,097 | 1/1958 | Finlay . |
| 2,828,363 | 3/1958 | Ray . |
| 2,932,794 | 4/1960 | Crow ........................................ 328/156 |
| 3,045,066 | 7/1962 | Beuscher . |
| 3,280,259 | 10/1966 | Cotter . |
| 3,334,185 | 8/1967 | Marlot . |
| 3,369,078 | 2/1968 | Stradley . |
| 3,399,397 | 8/1968 | Josephson ................................ 340/216 |
| 3,400,221 | 9/1968 | Wolters . |
| 3,475,561 | 10/1969 | Krasin et al. .............................. 179/15 |
| 3,521,267 | 7/1970 | Lester et al. .............................. 340/310 |
| 3,529,216 | 9/1970 | Kolm et al. ............................... 317/147 |
| 3,659,280 | 4/1972 | Donohoo .................................. 340/310 |
| 3,693,155 | 9/1972 | Crafton et al. ....................... 340/147 R |
| 3,810,096 | 5/1974 | Kabat et al. .......................... 340/147 R |
| 3,818,481 | 6/1974 | Dorfman et al. .................... 340/310 R |
| 3,846,638 | 11/1974 | Wetherell .................................... 307/3 |
| 3,852,740 | 12/1974 | Haymes .................................... 340/416 |
| 3,876,984 | 4/1975 | Chertok ................................ 340/152 R |
| 3,911,415 | 10/1975 | Whyte .................................. 340/310 A |
| 3,922,664 | 11/1975 | Wadsworth .............................. 340/276 |
| 3,924,223 | 12/1975 | Whyte et al. ........................ 340/310 R |
| 3,925,728 | 12/1975 | Whyte .................................. 340/310 R |
| 3,925,763 | 12/1975 | Wadhwani et al. .................. 340/164 R |

(List continued on next page.)

FOREIGN PATENT DOCUMENTS

| | | | |
|---|---|---|---|
| B1-12488/76 | 6/1977 | Australia .......................... H04B 3/54 |
| 1057436 | 6/1979 | Canada ............................ H04M 1/72 |
| 1 216 689 | 1/1987 | Canada ............................ H04M 1/72 |
| 0 078 171 A2 | 10/1982 | European Pat. Off. ......... H02J 13/00 |
| 000 555 869 A2 | 8/1993 | European Pat. Off. .......... H04B 3/54 |
| 544243 | 4/1942 | United Kingdom . |
| 549948 | 12/1942 | United Kingdom . |
| 553255 | 5/1943 | United Kingdom . |
| 683265 | 11/1952 | United Kingdom . |
| 1393424 | 5/1971 | United Kingdom . |
| 2 094 598 | 2/1982 | United Kingdom ............. H04B 3/54 |
| WO 88/09589 | 5/1988 | WIPO .............................. H04H 5/00 |
| WO 90/13950 | 4/1990 | WIPO . |
| WO 91/07833 | 11/1990 | WIPO .............................. H04M 1/60 |
| WO 93/107693 | 10/1992 | WIPO .............................. H04J 13/00 |
| WO 93/23928 | 5/1993 | WIPO .............................. H04B 1/38 |
| WO 94/22257 | 3/1994 | WIPO .............................. H04M 9/00 |
| WO 95/19070 | 1/1995 | WIPO .............................. H04B 3/54 |

Primary Examiner—Paul Loomis
Attorney, Agent, or Firm—Lloyd W. Sadler

[57] ABSTRACT

A wireless power line carrier voice and data communication device is provided. The device permits a user to connect a caller identification unit to a telephone extension whose only connection to a telephone line is over an AC power line. The invention provides for appropriate amplification, joining with other audio paths, and transmission while requiring no hardware modifications of the extension unit or the wireless extension jack.

1 Claim, 4 Drawing Sheets

U.S. PATENT DOCUMENTS

| | | | |
|---|---|---|---|
| 3,942,168 | 3/1976 | Whyte | 324/142 |
| 3,949,172 | 4/1976 | Brown et al. | 340/310 R |
| 3,967,264 | 6/1976 | Whyte et al. | 340/310 A |
| 3,973,087 | 8/1976 | Fong | 179/170 R |
| 3,980,954 | 9/1976 | Whyte | 325/48 |
| 4,012,733 | 3/1977 | Whyte | 340/310 A |
| 4,012,734 | 3/1977 | Jagoda et al. | 340/310 A |
| 4,016,429 | 4/1977 | Vercellotti et al. | 307/149 |
| 4,057,793 | 11/1977 | Johnson et al. | 340/310 R |
| 4,058,678 | 11/1977 | Dunn et al. | 179/2.5 R |
| 4,065,763 | 12/1977 | Whyte et al. | 340/310 R |
| 4,107,656 | 8/1978 | Farnsworth | 340/151 |
| 4,161,027 | 7/1979 | Russell | 364/492 |
| 4,173,754 | 11/1979 | Feiker | 340/310 R |
| 4,174,517 | 11/1979 | Mandel | 340/310 A |
| 4,218,655 | 8/1980 | Johnston et al. | 455/39 |
| 4,222,035 | 9/1980 | Lohoff | 340/167 R |
| 4,239,940 | 12/1980 | Dorfman | 179/2.51 |
| 4,254,403 | 3/1981 | Perez-Cavero et al. | 340/310 R |
| 4,307,380 | 12/1981 | Gander | 340/310 R |
| 4,321,581 | 3/1982 | Tappeiner et al. | 340/310 R |
| 4,323,882 | 4/1982 | Gajjar | 340/310 R |
| 4,344,066 | 8/1982 | Beggs | 340/310 A |
| 4,357,598 | 11/1982 | Melvin, Jr. | 340/310 A |
| 4,371,867 | 2/1983 | Gander | 340/310 R |
| 4,377,804 | 3/1983 | Suzuki | 340/310 A |
| 4,386,436 | 5/1983 | Kocher et al. | 455/151 |
| 4,400,688 | 8/1983 | Johnston et al. | 340/310 R |
| 4,408,185 | 10/1983 | Rasmussen | 340/310 A |
| 4,408,186 | 10/1983 | Howell | 340/310 A |
| 4,429,299 | 1/1984 | Kabat et al. | 340/310 R |
| 4,433,326 | 2/1984 | Howell | 340/310 A |
| 4,442,319 | 4/1984 | Treidl | 179/2 A |
| 4,471,399 | 9/1984 | Udren | 361/64 |
| 4,473,817 | 9/1984 | Perkins | 340/310 R |
| 4,475,193 | 10/1984 | Brown | 370/124 |
| 4,479,033 | 10/1984 | Brown et al. | 179/2.51 |
| 4,495,386 | 1/1985 | Brown et al. | 179/2.51 |
| 4,514,594 | 4/1985 | Brown et al. | 179/2.51 |
| 4,523,307 | 6/1985 | Brown | 370/30 |
| 4,535,447 | 8/1985 | Rosanes et al. | 370/77 |
| 4,538,136 | 8/1985 | Drabing | 340/310 R |
| 4,556,864 | 12/1985 | Roy | 340/310 A |
| 4,556,865 | 12/1985 | Fukagawa et al. | 340/310 R |
| 4,556,866 | 12/1985 | Gorecki | 340/310 A |
| 4,559,520 | 12/1985 | Johnston | 340/310 R |
| 4,599,598 | 7/1986 | Komoda et al. | 340/310 A |
| 4,609,839 | 9/1986 | Howell | 307/542 |
| 4,611,274 | 9/1986 | Machino et al. | 364/200 |
| 4,633,218 | 12/1986 | Palsgrove et al. | 340/310 R |
| 4,638,298 | 1/1987 | Spiro | 340/827 |
| 4,638,299 | 1/1987 | Campbell | 340/310 A |
| 4,641,126 | 2/1987 | Crowe | 340/310 A |
| 4,641,322 | 2/1987 | Hasegawa | 375/1 |
| 4,642,607 | 2/1987 | Strom et al. | 340/310 A |
| 4,644,321 | 2/1987 | Kennon | 340/310 A |
| 4,675,648 | 6/1987 | Roth et al. | 340/310 A |
| 4,701,945 | 10/1987 | Pedigo | 379/66 |
| 4,745,391 | 5/1988 | Gajjar | 340/310 A |
| 4,745,392 | 5/1988 | Ise et al. | 340/310 R |
| 4,746,897 | 5/1988 | Shuey | 340/310 R |
| 4,749,992 | 6/1988 | Fitzemeyer et al. | 340/870.02 |
| 4,759,016 | 7/1988 | Otsuka | 370/95 |
| 4,763,103 | 8/1988 | Galula et al. | 340/310 R |
| 4,772,870 | 9/1988 | Reyes | 340/310 R |
| 4,774,493 | 9/1988 | Rabinowitz | 340/310 A |
| 4,783,780 | 11/1988 | Alexis | 370/95 |
| 4,788,527 | 11/1988 | Johansson | 340/310 A |
| 4,809,296 | 2/1989 | Braun et al. | 375/1 |
| 4,829,570 | 5/1989 | Schotz | 381/3 |
| 4,835,517 | 5/1989 | van der Gracht et al. | 340/310 A |
| 4,845,466 | 7/1989 | Hariton et al. | 340/310 R |
| 4,847,903 | 7/1989 | Schotz | 381/3 |
| 4,864,589 | 9/1989 | Endo | 375/1 |
| 4,866,733 | 9/1989 | Morishita | 375/1 |
| 4,890,089 | 12/1989 | Shuey | 340/310 A |
| 4,912,553 | 3/1990 | Pal et al. | 358/86 |
| 4,962,496 | 10/1990 | Vercellotti et al. | 370/11 |
| 4,963,853 | 10/1990 | Mak | 340/310 A |
| 4,968,970 | 11/1990 | LaPorte | 340/310 A |
| 4,988,972 | 1/1991 | Takagi | 340/310 A |
| 4,995,053 | 2/1991 | Simpson et al. | 375/1 |
| 5,003,457 | 3/1991 | Ikei et al. | 364/133 |
| 5,032,833 | 7/1991 | Laport | 340/825.02 |
| 5,049,876 | 9/1991 | Kahle et al. | 340/825.57 |
| 5,063,563 | 11/1991 | Ikeda et al. | 370/110.1 |
| 5,065,133 | 11/1991 | Howard | 340/310 A |
| 5,066,939 | 11/1991 | Mansfield, Jr. | 340/310 R |
| 5,127,045 | 6/1992 | Cragun et al. | 455/402 |
| 5,136,612 | 8/1992 | Bi | 375/1 |
| 5,151,838 | 9/1992 | Dockery | 340/310 R |
| 5,155,466 | 10/1992 | Go | 340/310 R |
| 5,168,510 | 12/1992 | Hill | 375/40 |
| 5,187,865 | 2/1993 | Dolin, Jr. | 29/868 |
| 5,192,231 | 3/1993 | Dolin, Jr. | 439/620 |
| 5,210,518 | 5/1993 | Graham et al. | 340/310 R |
| 5,241,283 | 8/1993 | Sutterlin | 330/51 |
| 5,257,006 | 10/1993 | Graham et al. | 340/310 A |
| 5,262,755 | 11/1993 | Mak et al. | 340/310 R |
| 5,274,699 | 12/1993 | Ranz | 379/142 |
| 5,278,862 | 1/1994 | Mey | 375/1 |
| 5,289,476 | 2/1994 | Johnson et al. | 371/37.1 |
| 5,319,634 | 6/1994 | Bartholomew et al. | 370/18 |
| 5,327,230 | 7/1994 | Dockery | 348/8 |
| 5,349,644 | 9/1994 | Massey et al. | 395/200 |
| 5,351,272 | 9/1994 | Abraham | 375/38 |
| 5,355,114 | 10/1994 | Sutterlin et al. | 340/310 A |
| 5,357,541 | 10/1994 | Cowart | 375/1 |
| 5,404,127 | 4/1995 | Lee et al. | 340/310.02 |
| 5,406,248 | 4/1995 | Le Van Suu | 340/310.01 |
| 5,406,249 | 4/1995 | Pettus | 340/310.06 |
| 5,410,292 | 4/1995 | Le Van Suu | 340/310.06 |
| 5,412,369 | 5/1995 | Kirchner | 340/310.03 |
| 5,424,709 | 6/1995 | Tal | 340/310.01 |
| 5,448,593 | 9/1995 | Hill | 375/267 |
| 5,452,344 | 9/1995 | Larson | 379/107 |
| 5,461,629 | 10/1995 | Sutterlin et al. | 371/30 |
| 5,463,662 | 10/1995 | Sutterlin et al. | 375/351 |
| 5,467,011 | 11/1995 | Hunt | 324/67 |
| 5,471,190 | 11/1995 | Zimmermann | 340/310.01 |
| 5,504,454 | 4/1996 | Daggett et al. | 329/304 |
| 5,530,737 | 6/1996 | Bartholomew et al. | 455/402 |
| 5,530,741 | 6/1996 | Rubru | 379/142 |
| 5,550,905 | 8/1996 | Silverman | 379/142 |
| 5,554,968 | 9/1996 | Lee | 340/310.01 |
| 5,559,377 | 9/1996 | Abraham | 307/104 |
| 5,630,204 | 5/1997 | Hylton et al. | 455/3.3 |
| 5,684,450 | 11/1997 | Brown | 340/310.02 |
| 5,745,552 | 4/1998 | Chambers et al. | 455/402 |

CALLER IDENTIFICATION SYSTEM FOR WIRELESS PHONE JACKS AND WIRELESS MODEM JACKS

BACKGROUND OF THE INVENTION

1. Field of the Invention

This invention relates to telephone communications systems employing power line carrier as a communication channel. More specifically, this invention relates to devices for making caller identification of telephone calls received by telephone communications equipment using AC power line carrier communication channel.

2. Description of Related Art

A variety of power line carrier telephone voice and/or data communication systems have been developed and are used to facilitate telephonic communications in locations where little or no availability exists for dedicated telephone wires. Moreover, caller identification circuitry for use in or with telephone communication equipment, is well known. While each of these technologies are well known to those of skill in the art, the incorporation of caller identification circuitry, specifically designed for use in power line telephone communications, provides a new and non-obvious synergy while overcoming previous problems in the technology. No known combinations of caller identification circuitry and power line carrier are known to the inventors. Prior power line carrier systems have included the following United States and international patents: U.S. Pat. Nos. 2,510,273, 2,516,211, 2,516,763, 2,535,446, 2,567,908, 2,577,731, 2,654,805, 2,820,097, 2,828,363, 2,932,794, 3,045,066, 3,280,259, 3,334,185, 3,369,078, 3,399,397, 3,400,221, 3,475,561, 3,521,267, 3,529,216, 3,659,280, 3,693,155, 3,810,096, 3,818,481, 3,846,638, 3,852,740, 3,876,984, 3,911,415, 3,922,664, 3,924,223, 3,925,763, 3,925,728, 3,942,168, 3,949,172, 3,967,264, 3,973,087, 3,980,954, 4,012,733, 4,012,734, 4,016,429, 4,057,793, 4,058,678, 4,065,763, 4,107,656, 4,161,027, 4,173,754, 4,174,517, 4,218,655, 4,222,035, 4,239,940, 4,254,403, 4,307,380, 4,321,581, 4,323,882, 4,344,066, 4,357,598, 4,371,867, 4,377,804, 4,386,436, 4,400,688, 4,408,185, 4,408,186, 4,429,299, 4,433,326, 4,442,319, 4,471,399, 4,473,817, 4,475,193, 4,479,033, 4,495,386, 4,514,594, 4,523,307, 4,535,447, 4,538,136, 4,556,864, 4,556,865, 4,556,866, 4,559,520, 4,599,598, 4,609,839, 4,611,274, 4,633,218, 4,638,298, 4,638,299, 4,641,126, 4,641,322, 4,642,607, 4,644,321, 4,675,648, 4,701,945, 4,745,391, 4,745,392, 4,746,897, 4,749,992, 4,759,016, 4,763,103, 4,772,870, 4,774,493, 4,783,780, 4,788,527, 4,809,296, 4,829,570, 4,835,517, 4,845,466, 4,847,903, 4,864,589, 4,866,733, 4,890,089, 4,912,553, 4,962,496, 4,963,853, 4,968,970, 4,988,972, 4,995,053, 5,003,457, 5,032,833, 5,049,876, 5,063,563, 5,065,133, 5,066,939, 5,136,612, 5,151,838, 5,155,466, 5,168,510, 5,187,865, 5,192,231, 5,210,518, 5,241,283, 5,257,006, 5,262,755, 5,274,699, 5,278,862, 5,289,476, 5,319,634, 5,327,230, 5,349,644, 5,351,272, 5,355,114, 5,357,541, 5,404,127, 5,406,248, 5,406,249, 5,410,292, 5,412,369, 5,424,709, 5,448,593, 5,452,344, 5,461,629, 5,463,662, 5,467,011, 5,471,190, 5,504,454, 5,530,737, 5,530,741, 5,550,905, 5,554,968, 5,559,377, 5,630,204, GB 544,243, GB 549,948, GB 553,225, GB 683,265, GB 1,393,424, GB 2,094,598, AU-B1-12,488/76, Canada 1057436, Canada 1216689, EPO 0 078 171 A2, EPO 0 555 869 A2, PCT/US83/01717, PCT/US90/02291, PCT/US90/06701, PCT/US92/08510, PCT/US93/04726, PCT/US94/03110, and PCT/US95/00354 each of which is hereby incorporated by reference in its entirety for the material disclosed therein.

SUMMARY OF THE INVENTION

It is desirable to provide a means for passing caller identification ("Caller ID") to the receiver of a telephone call when the telephone call makes use of the power line carrier communication channel. Wireless, power line carrier telephone communication systems provide many important advantages to telephone users, especially where standard telephone jacks are limited or unavailable and where AC supply power is readily available to the users. The advantages of such systems are discussed in some detail in previously cited patent literature. However, Caller ID has previously been unavailable over power line carrier systems. In the last several years, since Caller ID has become available to private homes and businesses more and more telephone customers have come to rely on Caller ID as a method of screening telephone calls. To provide the Caller ID feature to power line carrier wireless telephones requires an enhancement of prior power line carrier telephone interfaces.

Therefore, it is an object of this invention to provide power line carrier wireless telephone communications equipment that provides a means of passing the caller identification signal through the power line carrier wireless telephone jack to support the connection and operation of a Caller ID unit to the wireless phone jack.

These and other objectives of this invention will be readily apparent to the reader upon consideration of the attached drawings and of the following detailed description of those drawings, the preferred embodiment of the invention, and the claims.

These and other objectives of this invention are achieved, in the preferred embodiment of the invention, by an electronic device in which a base unit is plugged into the AC power outlet near a telephone line. The base unit can be either a power line carrier (wireless) telephone jack base unit or a power line carrier (wireless) modem jack base unit. Further the base unit has a separate connection to the tip and ring of the telephone line to bypass the standard audio path. The tip and ring connection is amplified by a separate amplifier with a gain of ½ the normal audio path, to provide a voltage difference between the on-hook condition and the off-hook condition, since Caller ID operates when the telephone is on-hook and the communication signal is sent with the telephone off-hook. After amplification, the Caller ID signal is summed with the audio and data signals which modulate the voltage controlled oscillator, thereby permitting the Caller ID signal to be transferred across the power line carrier communications channel.

DETAILED DESCRIPTION OF THE INVENTION

This invention is an electronic apparatus which provides the means for passing on caller identification ("Caller ID") information from the telephone system across a power line carrier communication channel and to a telephone extension or Caller ID unit attached to the phone connection of the telephone call receiver. This invention permits the user of a wireless power line carrier telephone to connect a Caller ID unit and to his or her power line carrier interface equipment and to have it function properly.

Figure 1:
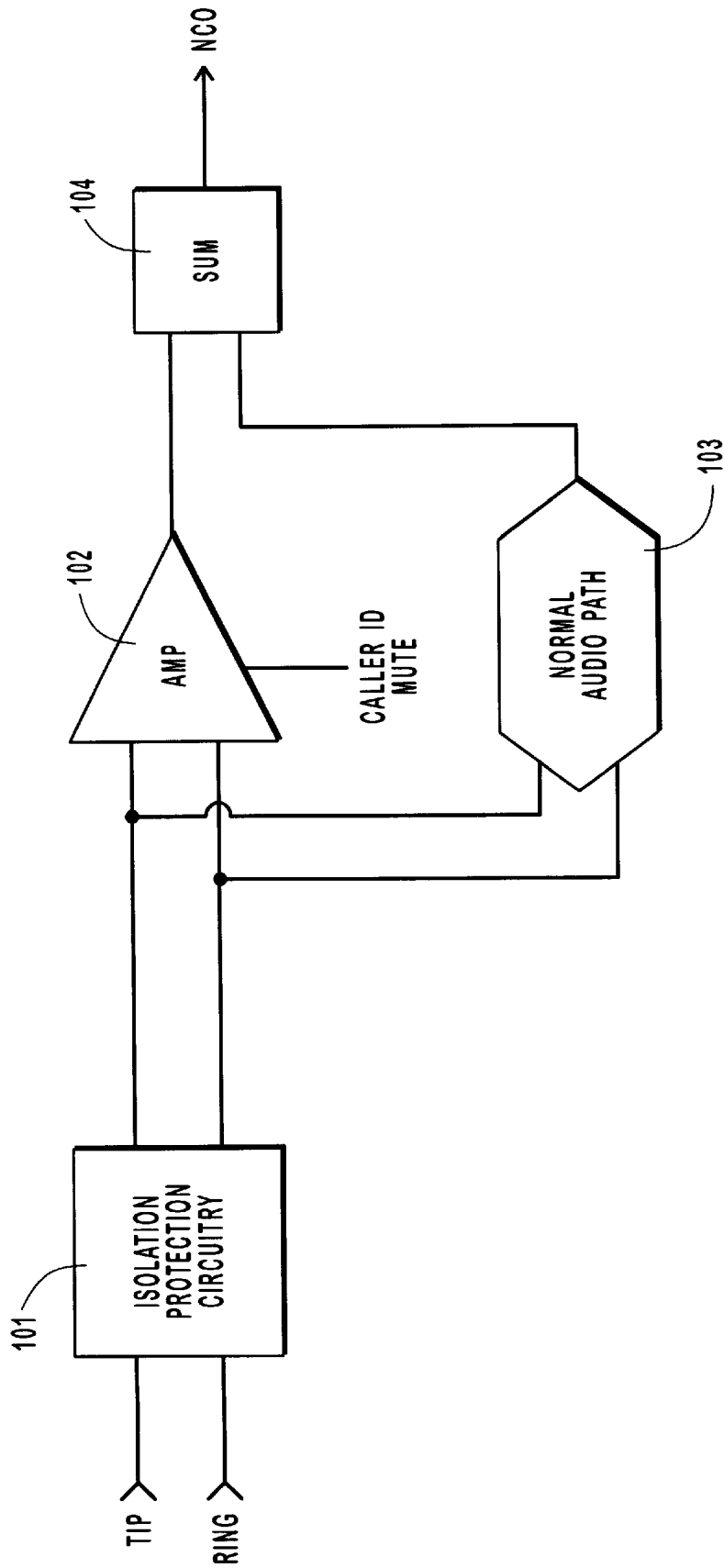
FIG. 1 is a top level block diagram showing the major sections of the invention.

FIG. 1 shows a top level block diagram of the major component sections of the invention, which in its preferred embodiment is incorporated into the base unit of a wireless telephone or modem jack. The "Tip" and "Ring" signals are received by isolation/protection circuitry 101, which in turn outputs an audio signal. The audio signal is provided a separate electrical path from the normal audio path 103. This separate electrical path includes an amplifier 102 which provides a gain of ½ that of the normal audio path 103. This gain reduction is necessary because when a telephone is on-hook, its voltage requirements change, requiring significantly less voltage than when the telephone is off-hook. A Caller ID works when the telephone is on-hook, while audio is sent when the telephone is off-hook. After the amplifier 102 the Caller ID signal is summed 104 with the audio and data signals coming from the normal audio path 103. The output of the sum 104 is used to modulate the voltage controlled oscillator (VCO).

Figure 2:
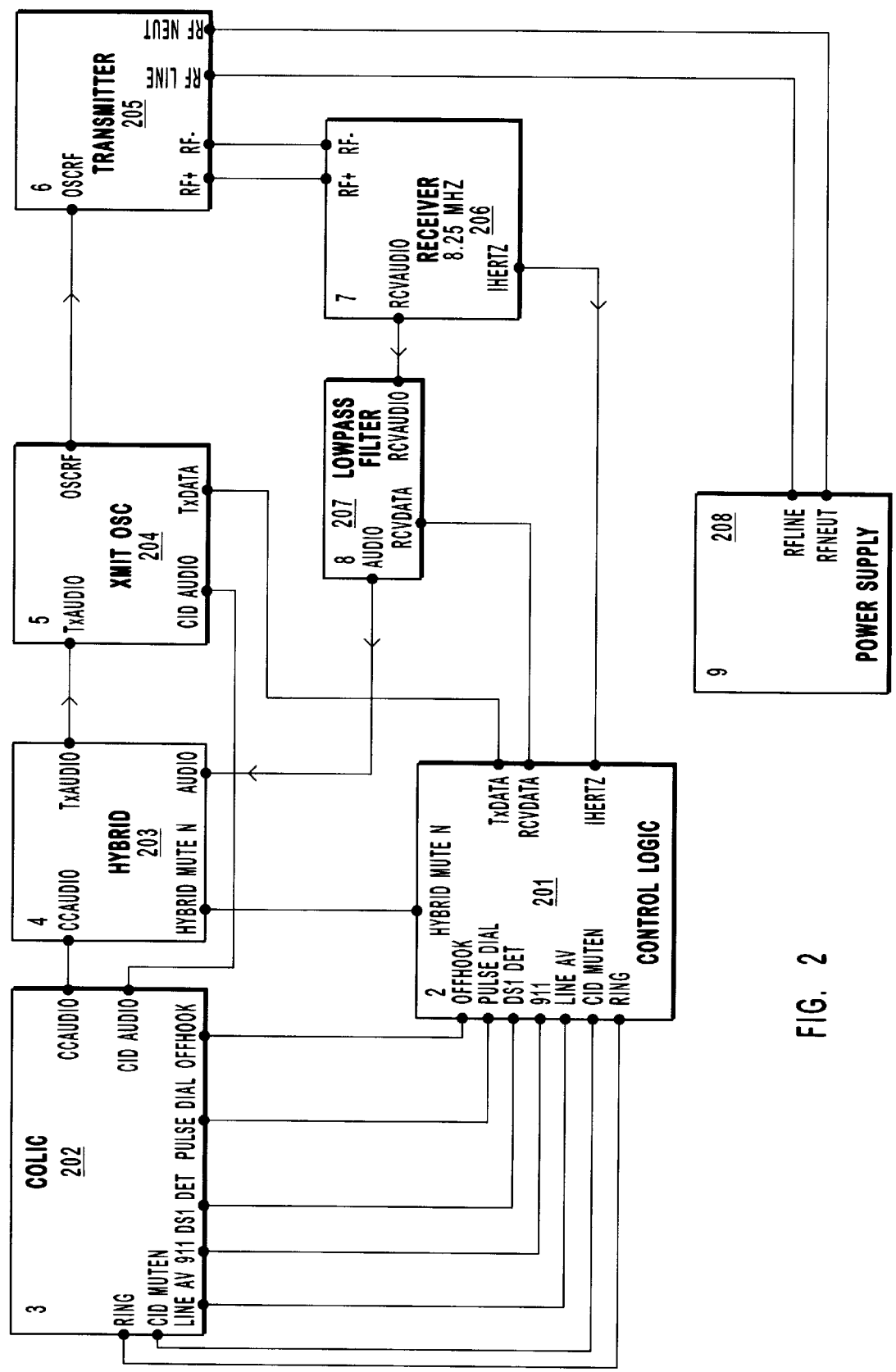
FIG. 2 is a detailed interface diagram of the preferred embodiment of the base unit of the invention.

FIG. 2 provides a detailed interface diagram of the preferred embodiment of the base unit of the invention, in which the Caller ID circuitry is incorporated. Control Logic 201 is provided to control the functions of the base unit. A carrier line interface circuit (COLIC) 202 is provided to send and receive the standard telephone or modem RJ-11 connection signals from the standard wall telephone connection. It is within the COLIC that the Caller ID circuitry operates. A more detailed description of the operation of this circuitry follows in the discussion of FIG. 4. A hybrid circuit 203 is provided to providing a mute capability to the received audio signal. A transmit oscillator (XMIT OSC)204 is provided which receives transmitted audio from the hybrid circuit 203 and generates the RF carrier signal for the transmitter 205. The transmitter 205 receives the RF carrier signal from the transmit oscillator (XMIT OSC) 204 and produces the RF line carrier signals for transmitting across the power lines. A receiver 206 is provided which receives power line RF signals and generates a received audio signal. The lowpass filter 207 receives the received audio signal from the receiver 206, filtering and splitting off audio and data for transmission to the user's telephone extension or modem. The power supply circuit 208 receives and transmits RF line carrier signals from and to the transmitter 205 interfaces with the AC power lines.

Figure 3:
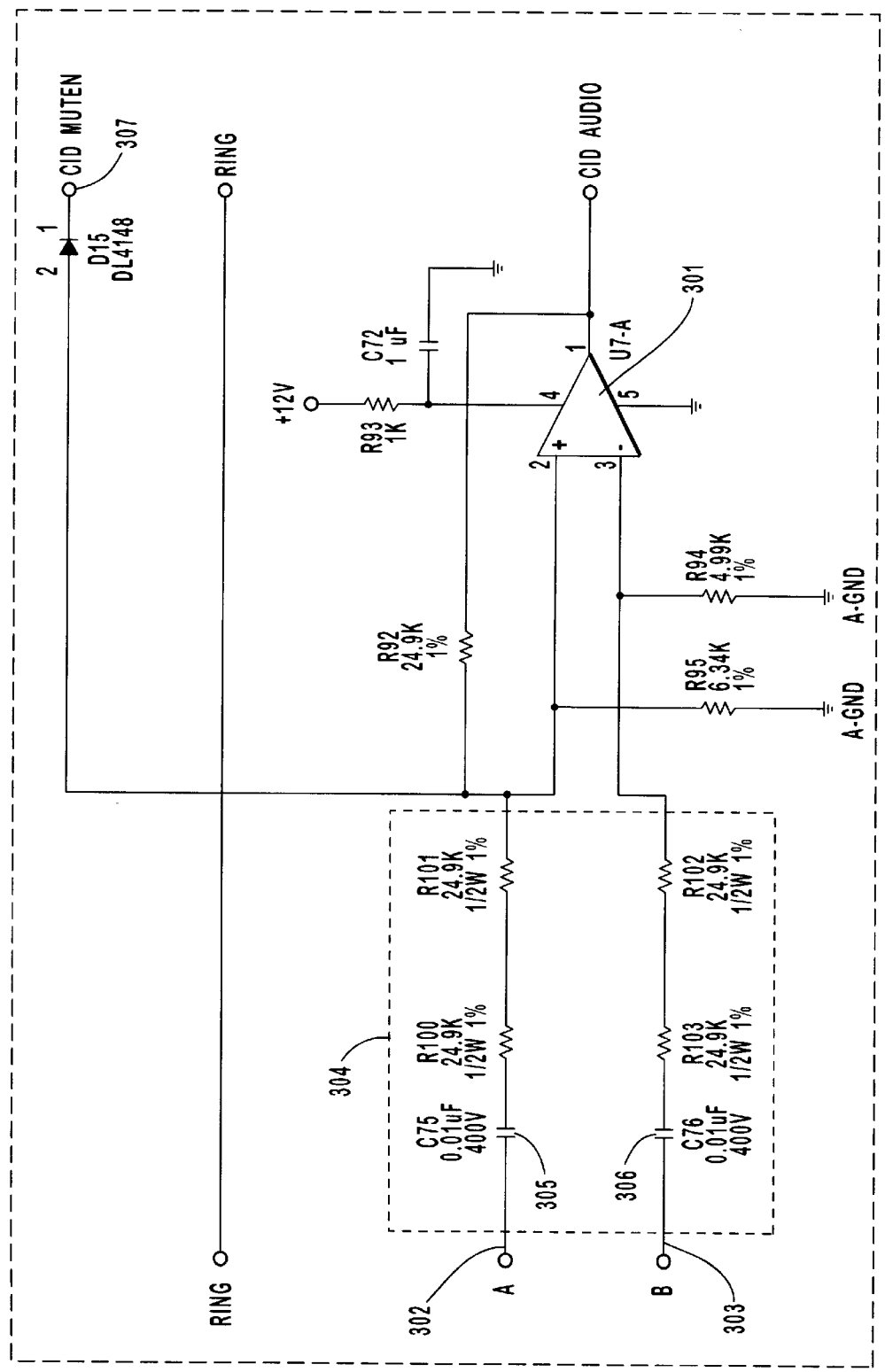
FIG. 3 is a detailed schematic of the preferred embodiment of the caller ID circuit.

FIG. 3 shows the detailed schematic of the preferred embodiment of the caller ID circuit. Isolated telephone signals are provided at A 302 and B 303. Filtering is provided by an RC circuit 304. In the preferred embodiment of the invention each signal, A 302 and B 303, is required to pass through a 0.01 μF capacitor 305, 306, followed by two 24.5 kΩ resistors. A caller ID mute line 307 is provided. A caller ID signal amplifier circuit 301 is used to boost the signal of the caller ID.

Figure 4:
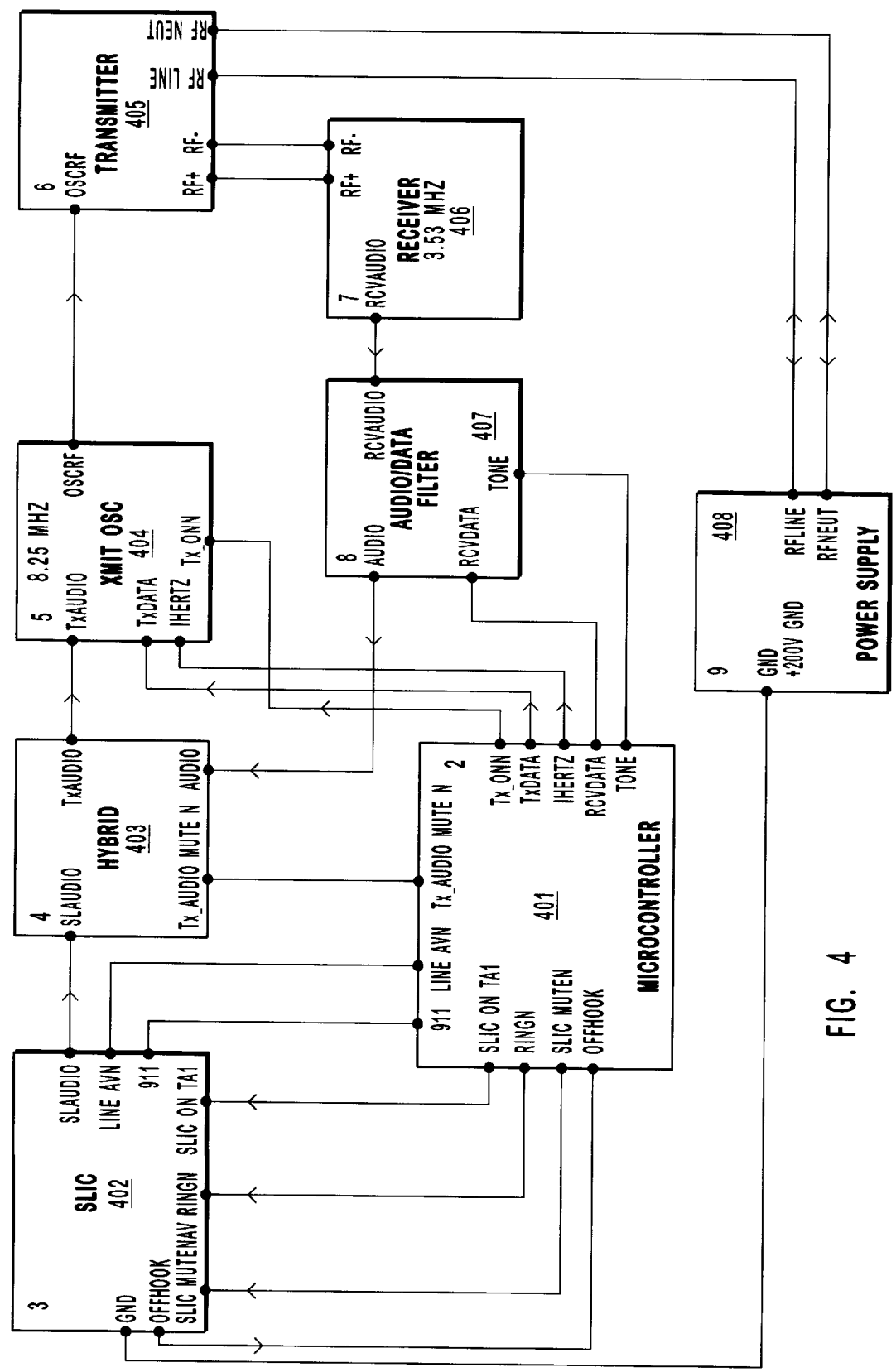
FIG. 4 is a detailed interface diagram of the preferred embodiment of the extension unit of the invention.

FIG. 4 shows the detailed interface block diagram of the preferred embodiment of the extension unit of the invention. A microcontroller 401 is provided to control the functions of the extension unit. A subscriber line interface circuit (SLIC) 402 is provided to receive the standard telephone or modem RJ-11 connection from the user's telephone extension or modem. A hybrid circuit 403 is provided to providing a mute capability to the received audio signal. A transmit oscillator 404 is provided which receives transmitted audio from the hybrid circuit 403 and generates the RF carrier signal for the transmitter 405. The transmitter 405 receives the RF carrier signal from the transmit oscillator (XMIT OSC) 404 and produces the RF line carrier signals for transmitting across the power lines. A receiver 406 is provided which receives power line RF signals and generates a received audio signal. The audio/data filter 407 receives the received audio signal from the receiver 406 and splits off audio and data for transmission to the user's telephone extension or modem. The power supply circuit 408 receives and transmits RF line carrier signals from and to the transmitter 405 interfaces with the AC power lines.

The previously described preferred embodiment of the invention is to be considered in all respects only as illustrative and not as restrictive. Although the embodiment shown here defines certain values of components and certain subsections of related circuitry, the invention is not limited thereto. The scope of this invention is indicated by the appended claims rather than by the foregoing description. All devices which come directly within the claims or within the meaning and range of equivalency of the claims are to be embraced within the scope.

We claim:

1. A wireless communications apparatus for connecting and enabling a caller identification unit to a power line communication channel, comprising:

(A) a base unit connected to an AC power line for the transmission and receipt of voice and data signals;

(B) an extension unit connected to an AC power line for the transmission and receipt of voice and data signals to and from said base unit; and (C) a caller identification signal amplification circuit electrically connected to said base to enable the transmission of caller identification signals to said extension unit, wherein said caller identification signal amplification circuit further comprises:

(i) a second signal path;

(ii) an amplifier connected into said second signal path to generate an amplified caller identification signal; and (iii) a summer to sum said amplified caller identification signal with a signal from a first signal path.

* * * * *